(12) United States Patent
Wang et al.

(10) Patent No.: US 7,533,523 B2
(45) Date of Patent: May 19, 2009

(54) OPTIMIZED DESULFATION TRIGGER CONTROL FOR AN ADSORBER

(75) Inventors: Yue-Yun Wang, Troy, MI (US); Samuel C. Geckler, Columbus, IN (US); Jer-Sheng J. Chen, Naperville, IL (US); Michael J. Cunningham, Greenwood, IN (US); Sriram Satya Srinivas Popuri, Greenwood, IN (US); Michael J. Ruth, Franklin, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 11/593,723

(22) Filed: Nov. 7, 2006

(65) Prior Publication Data
US 2008/0104946 A1 May 8, 2008

(51) Int. Cl.
*F01N 3/00* (2006.01)

(52) U.S. Cl. .............................. 60/295; 60/274; 60/277; 60/285; 60/297; 60/301

(58) Field of Classification Search .................. 60/274, 60/277, 285, 295, 297, 301, 311
See application file for complete search history.

(56) References Cited

U.S. PATENT DOCUMENTS

| | | | |
|---|---|---|---|
| 4,222,236 A | 9/1980 | Hegedus et al. |
| 5,473,887 A | 12/1995 | Takeshima et al. |
| 5,529,048 A | 6/1996 | Kurihara et al. |
| 5,531,203 A | 7/1996 | Komatsuda et al. |
| 5,600,947 A | 2/1997 | Cullen |
| 5,635,142 A | 6/1997 | Ichiki et al. |
| 5,743,084 A | 4/1998 | Hepburn |
| 5,784,879 A | 7/1998 | Dohta et al. |
| 5,878,567 A | 3/1999 | Adamczyk, Jr. et al. |
| 5,894,725 A | 4/1999 | Cullen et al. |
| 5,915,359 A | 6/1999 | Meyer et al. |
| 6,185,935 B1 | 2/2001 | Dickers et al. |
| 6,199,372 B1 | 3/2001 | Wakamoto |
| 6,202,406 B1 | 3/2001 | Griffin et al. |
| 6,205,773 B1 | 3/2001 | Suzuki |
| 6,212,884 B1 | 4/2001 | Ohuchi et al. |
| 6,216,449 B1 | 4/2001 | Strehlau et al. |
| 6,244,046 B1 | 6/2001 | Yamashita |
| 6,266,957 B1 | 7/2001 | Nozawa et al. |
| 6,272,848 B1 | 8/2001 | Okude et al. |
| 6,308,515 B1 | 10/2001 | Bidner et al. |
| 6,311,482 B1 | 11/2001 | Yamashita |

(Continued)

*Primary Examiner*—Thomas E Denion
*Assistant Examiner*—Diem Tran
(74) *Attorney, Agent, or Firm*—J. Bruce Schelkopf, Esq.; Krieg DeVault LLP

(57) ABSTRACT

A system, method, and software for triggering regeneration of an adsorber connected with a flow of exhaust from an engine. A sulfur loading estimate module is used to generate an estimated sulfur loading value associated with an adsorber. A desulfation trigger module is used to trigger a desulfation event for the adsorber upon detection of a trigger event comprising either a cost-effective trigger event, a loading trigger event, and a forced trigger event. A combustion manager module is used to control an engine through engine management to regenerate the adsorber during the desulfation event. A interrupt module is used to interrupt the desulfation event upon detection of an interrupt event. An end desulfation module is used to stop or end the desulfation event upon detection of an end desulfation event.

34 Claims, 12 Drawing Sheets

U.S. PATENT DOCUMENTS

| | | |
|---|---|---|
| 6,318,075 B1 | 11/2001 | Gunther et al. |
| 6,327,847 B1 | 12/2001 | Surnilla et al. |
| 6,327,848 B1 | 12/2001 | Poggio et al. |
| 6,345,498 B2 | 2/2002 | Yonekura et al. |
| 6,360,530 B1 | 3/2002 | Robichaux et al. |
| 6,370,868 B1 | 4/2002 | Kolmanovsky et al. |
| 6,374,597 B1 | 4/2002 | Bidner et al. |
| 6,389,802 B1 | 5/2002 | Berger et al. |
| 6,401,454 B2 * | 6/2002 | Takano et al. ............ 60/277 |
| 6,408,620 B2 | 6/2002 | Boegner et al. |
| 6,422,003 B1 | 7/2002 | Ament et al. |
| 6,427,439 B1 | 8/2002 | Xu et al. |
| 6,434,928 B1 | 8/2002 | Manaka |
| 6,438,944 B1 | 8/2002 | Bidner et al. |
| 6,451,602 B1 | 9/2002 | Popoff et al. |
| 6,453,663 B1 | 9/2002 | Orzel et al. |
| 6,453,664 B2 | 9/2002 | Ishii et al. |
| 6,463,733 B1 | 10/2002 | Asik et al. |
| 6,467,259 B1 | 10/2002 | Surnilla et al. |
| 6,477,832 B1 | 11/2002 | Surnilla et al. |
| 6,481,199 B1 | 11/2002 | Bidner et al. |
| 6,487,849 B1 | 12/2002 | Bidner et al. |
| 6,487,850 B1 | 12/2002 | Bidner et al. |
| 6,490,858 B2 | 12/2002 | Barrett et al. |
| 6,490,860 B1 | 12/2002 | Farmer et al. |
| 6,497,092 B1 | 12/2002 | Theis |
| 6,502,387 B1 | 1/2003 | Asik et al. |
| 6,502,391 B1 | 1/2003 | Hirota et al. |
| 6,513,319 B2 | 2/2003 | Nozawa et al. |
| 6,513,322 B2 | 2/2003 | Ohuchi et al. |
| 6,531,099 B1 | 3/2003 | Held |
| 6,562,753 B2 | 5/2003 | Miyoshi et al. |
| 6,568,177 B1 | 5/2003 | Surnilla |
| 6,588,205 B1 | 7/2003 | Kumagai et al. |
| 6,594,990 B2 | 7/2003 | Kuenstler et al. |
| 6,615,577 B2 | 9/2003 | Meyer et al. |
| 6,644,021 B2 | 11/2003 | Okada et al. |
| 6,651,422 B1 | 11/2003 | LeGare |
| 6,688,101 B2 | 2/2004 | Isobe et al. |
| 6,766,642 B2 | 7/2004 | Binder et al. |
| 6,792,346 B2 | 9/2004 | Takebayashi et al. |
| 6,813,879 B2 | 11/2004 | Watner et al. |
| 6,813,882 B2 | 11/2004 | Hepburn et al. |
| 6,823,658 B2 | 11/2004 | Kuroda et al. |
| 6,823,664 B2 | 11/2004 | Nakatani et al. |
| 6,823,665 B2 | 11/2004 | Hirota et al. |
| 6,829,888 B2 | 12/2004 | Kuenstler et al. |
| 6,871,492 B2 | 3/2005 | Huynh et al. |
| 6,889,497 B2 | 5/2005 | Schnaibel et al. |
| 6,901,749 B2 | 6/2005 | Hashimoto |
| 6,941,748 B2 | 9/2005 | Pott et al. |
| 6,962,045 B2 | 11/2005 | Kitahara et al. |
| 6,990,799 B2 * | 1/2006 | Bidner et al. ............ 60/277 |
| 7,121,086 B2 * | 10/2006 | Nishii et al. ............ 60/295 |
| 7,134,274 B2 * | 11/2006 | Asanuma ............... 60/295 |
| 2001/0007191 A1 | 7/2001 | Ohuchi et al. |
| 2001/0010149 A1 | 8/2001 | Ishii et al. |
| 2001/0013223 A1 | 8/2001 | Boegner et al. |
| 2001/0032456 A1 | 10/2001 | Yonekura et al. |
| 2001/0035008 A1 | 11/2001 | Nozawa et al. |
| 2002/0056268 A1 | 5/2002 | Isobe et al. |
| 2002/0073696 A1 | 6/2002 | Kuenstler et al. |
| 2002/0141908 A1 | 10/2002 | Miyoshi et al. |
| 2002/0170287 A1 | 11/2002 | Hirota et al. |
| 2002/0178716 A1 | 12/2002 | Hpeburn et al. |
| 2002/0189235 A1 | 12/2002 | Meyer et al. |
| 2002/0189580 A1 | 12/2002 | Surnilla et al. |
| 2003/0000205 A1 | 1/2003 | Lewis et al. |
| 2003/0037541 A1 | 2/2003 | Farmer et al. |
| 2003/0056497 A1 | 3/2003 | Kuenstler et al. |
| 2003/0056499 A1 | 3/2003 | Binder et al. |
| 2003/0101713 A1 | 6/2003 | Dalla Betta et al. |
| 2003/0106306 A1 | 6/2003 | Nakatani et al. |
| 2003/0106307 A1 | 6/2003 | Okada et al. |
| 2003/0131591 A1 | 7/2003 | Pott et al. |
| 2003/0134425 A1 | 7/2003 | Ceccarini et al. |
| 2003/0177761 A1 | 9/2003 | Wagner et al. |
| 2003/0212484 A1 | 11/2003 | Takebayashi et al. |
| 2003/0213235 A1 | 11/2003 | Kitahara et al. |
| 2004/0003587 A1 | 1/2004 | Sakai |
| 2006/0137327 A1 * | 6/2006 | Shirakawa et al. ......... 60/285 |
| 2006/0277898 A1 * | 12/2006 | McCarthy ............... 60/286 |

* cited by examiner

OPTIMIZED DESULFATION TRIGGER CONTROL FOR AN ADSORBER

BACKGROUND

The present invention relates generally to exhaust treatment for an internal combustion engine and more particularly, but not exclusively, to a method, system, and software utilized to achieve both fuel economy and increased regeneration performance, to determine when regeneration is complete, and to handle interruptions of the regeneration process.

The Environmental Protection Agency ("EPA") is working aggressively to reduce pollution from new, heavy-duty diesel trucks and buses by requiring them to meet tougher emission standards that will make new heavy-duty vehicles up to 95% cleaner than older vehicles. Emission filters in the exhaust gas systems of internal combustion engines are used to remove unburned soot particles from the exhaust gas and to convert harmful pollutants such as hydrocarbons ("HC"), carbon monoxide ("CO"), oxides of nitrogen ("$NO_x$"), and oxides of sulfur ("$SO_x$") into harmless gases.

Exhaust gas is passed through a catalytic converter that is typically located between the engine and the muffler. In operation, the exhaust gases pass over one or more large surface areas that may be coated with a particular type of catalyst. A catalyst is a material that causes a chemical reaction to proceed at a usually faster rate without becoming part of the reaction process. The catalyst is not changed during the reaction process but rather converts the harmful pollutants into substances or gases that are not harmful to the environment.

$NO_x$ storage catalyst units or adsorbers are used to purify exhaust gases of combustion engines. These $NO_x$ storage catalyst units, in addition to storing or trapping $NO_x$, also trap and store unwanted $SO_x$ in the form of sulfates. The adsorption of $SO_x$ in the converter reduces the storage capacity of the adsorber and the catalytically active surface area of the catalyst. As such, $NO_x$ storage catalyst units must be regenerated to remove both $NO_x$ and $SO_x$. The process of regenerating $NO_x$ adsorbers varies depending on whether operating in a de-$NO_x$ mode (in which $NO_x$ is converted and removed from the unit) or a de-$SO_x$ mode (in which the unit is ran through a de-$SO_x$ process). Accordingly, there is a need for methods, systems and software for determining when to regenerate a $NO_x$ adsorber.

SUMMARY

One embodiment according to the present invention discloses a unique system for triggering desulfation of a $NO_x$ adsorber to achieve both fuel economy and optimum regeneration performance, determining when the desulfation process is complete, and handling interruptions during the desulfation process. Other embodiments include unique apparatuses, systems, devices, hardware, software, methods, and combinations of these for determining when to de-$SO_x$ an adsorber, determining when the de-$SO_x$ process is complete, and handling interruptions during the de-$SO_x$ process. Further embodiments, forms, objects, features, advantages, aspects, and benefits of the present invention shall become apparent from the following description and drawings.

DETAILED DESCRIPTION OF ILLUSTRATIVE EMBODIMENTS

Figure 1:
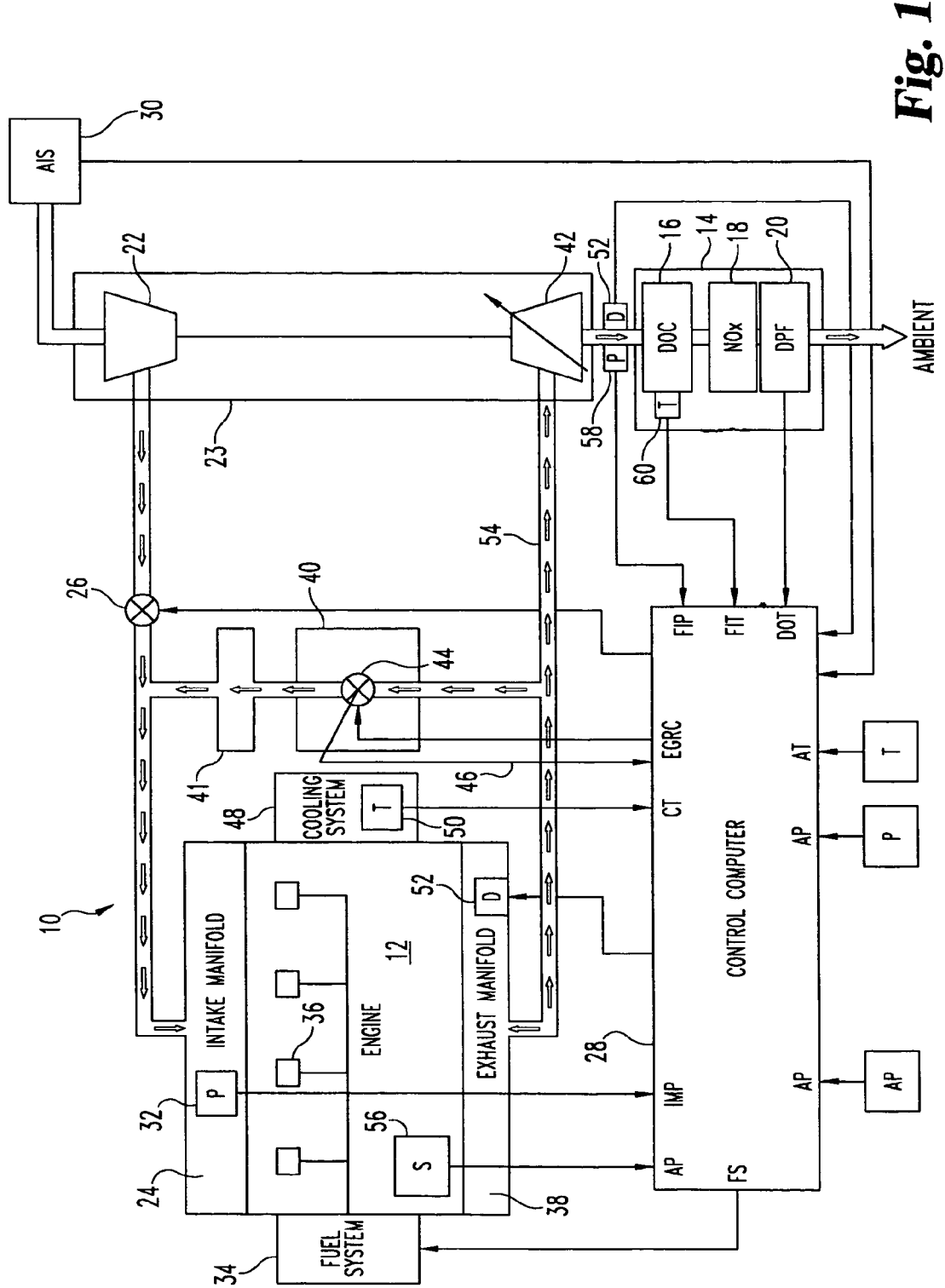
FIG. 1 is a schematic of a representative diesel engine system.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention is illustrated therein being contemplated as would normally occur to one skilled in the art to which the invention relates.

With reference to FIG. 1, there is illustrated, schematically, a system 10 that includes an internal combustion engine 12 operatively coupled with an exhaust filtration system 14. The exhaust filtration system 14 includes a diesel oxidation catalyst ("DOC") unit 16, a $NO_x$ adsorber or Lean $NO_x$ trap ("LNT") 18, and a diesel particulate filter ("DPF") 20. The exhaust filtration system 14 is operable to remove unwanted pollutants from exhaust gas exiting the engine 12 after the combustion process.

The DOC unit 16 is a flow through device that consists of a canister that may contain a honey-comb like structure or substrate. The substrate has a large surface area that is coated with an active catalyst layer. This layer may contain a small, well dispersed amount of precious metals such as, for example, platinum or palladium. As exhaust gas from the engine 12 traverses the catalyst, CO, gaseous HC and liquid HC particles (unburned fuel and oil) are oxidized, thereby reducing harmful emissions. The result of this process is that these pollutants are converted to carbon dioxide and water. In order to function properly, the DOC unit 16 must be heated to a minimum temperature value.

The $NO_x$ adsorber 18 is operable to absorb $NO_x$ created during the combustion process of the engine 12, thereby dramatically reducing the amount of $NO_x$ released into the atmosphere. The $NO_x$ adsorber 18 contains a catalyst that allows $NO_x$ to adsorb onto the catalyst. A byproduct of running the engine 12 in a lean mode is the production of harmful $NO_x$. The $NO_x$ adsorber 18 stores or absorbs $NO_x$ under lean engine operating conditions (lambda>1) and releases and catalytically reduces the stored $NO_x$ under rich engine operating conditions (lambda<1).

Under $NO_x$ regeneration, when the engine is operating under a rich condition at a predetermined temperature range, a catalytic reaction occurs. The stored $NO_x$ is catalytically converted to nitrogen ("$N_2$") and released from the $NO_x$ adsorber 18 thereby regenerating the $NO_x$ adsorber 18. The $NO_x$ adsorber 18 also has an affinity for trapping sulfur and desulfation or de-$SO_x$, which is the process for the removal of stored sulfur from the $NO_x$ adsorber 18, also requires rich engine operation, but for a longer period of time and at much higher temperatures than while operating in a de-$NO_x$ mode of operation.

The DPF 20 may comprise one of several type of particle filters known and used in the art. The DPF 20 is utilized to capture unwanted diesel particulate matter ("DPM") from the flow of exhaust gas exiting the engine 12. DPM is sub-micron size particles found in diesel exhaust. DPM is composed of both solid and liquid particles and is generally classified into three fractions: (1) inorganic carbon (soot), (2) organic fraction (often referred to as SOF or VOF), and (3) sulfate fraction (hydrated sulfuric acid). The DPF 20 may be regenerated at regular intervals by combusting the particulates collected in the DPF 20 through exhaust manipulation or the like. Those skilled in the art would appreciate that, as it relates to the present invention, several different types of DPFs may be utilized in the present invention.

During engine operation, ambient air is inducted from the atmosphere and compressed by a compressor 22 of a turbocharger 23 before being supplied to the engine 12. The compressed air is supplied to the engine 12 through an intake manifold 24 that is connected with the engine 12. An air intake throttle valve 26 is positioned between the compressor 22 and the engine 12 that is operable to control the amount of charge air that reaches the engine 12 from the compressor 22. The air intake throttle valve 26 may be connected with, and controlled by, an electronic control unit ("ECU") 28, but may be controlled by other means as well. For the purpose of the present invention, it is important to note that the air intake throttle valve 26 is operable to control the amount of charge air entering the intake manifold 24 via the compressor 22.

An air intake sensor 30 is included either before or after the compressor 22 to monitor the amount of ambient air or charge air being supplied to the intake manifold 24. The air intake sensor 30 may be connected with the ECU 28 and generates electric signals indicative of the amount of charge air flow. An intake manifold pressure sensor 32 is connected with the intake manifold 24. The intake manifold pressure sensor 32 is operative to sense the amount of air pressure in the intake manifold 24, which is indicative of the amount of air flowing or provided to the engine 12. The intake manifold pressure sensor 32 is connected with the ECU 28 and generates electric signals indicative of the pressure value that are sent to the ECU 28.

The system 10 may also include a fuel injection system 34 that is connected with, and controlled by, the ECU 28. The purpose of the fuel injection system 30 is to deliver fuel into the cylinders of the engine 12, while precisely controlling the timing of the fuel injection, fuel atomization, the amount of fuel injected, as well as other parameters. Fuel is injected into the cylinders of the engine 12 through one or more fuel injectors 36 and is burned with charge air received from the intake manifold 24. Various types of fuel injection systems may be utilized in the present invention, including, but not limited to, pump-line-nozzle injection systems, unit injector and unit pump systems, common rail fuel injection systems and so forth.

Exhaust gases produced in each cylinder during combustion leaves the engine 12 through an exhaust manifold 38 connected with the engine 12. A portion of the exhaust gas is communicated to an exhaust gas recirculation ("EGR") system 40 and a portion of the exhaust gas is supplied to a turbine 42. The turbocharger 23 may be a variable geometry turbocharger 23, but other turbochargers may be utilized as well. The EGR system 34 is used to cool down the combustion process by providing a predetermined amount of exhaust gas to the charge air being supplied by the compressor 22. Cooling down the combustion process reduces the amount of $NO_x$ produced during the combustion process. An EGR cooler 41 may be included to further cool the exhaust gas before being supplied to the air intake manifold 22 in combination with the compressed air passing through the air intake throttle valve 26.

The EGR system 40 includes an EGR valve 44 this is positioned in fluid communication with the outlet of the exhaust manifold 38 and the air intake manifold 24. The EGR valve 44 may also be connected to the ECU 28, which is capable of selectively opening and closing the EGR valve 44. The EGR valve 44 may also have incorporated therewith a differential pressure sensor that is operable to sense a pressure change, or delta pressure, across the EGR valve 44. A pressure signal 46 may also be sent to the ECU 44 indicative of the change in pressure across the EGR valve 44. The air intake throttle valve 26 and the EGR system 40, in conjunction with the fuel injection system 34, may be controlled to run the engine 12 in either a rich or lean mode.

As set forth above, the portion of the exhaust gas not communicated to the EGR system 40 is communicated to the turbine 42, which rotates by expansion of gases flowing through the turbine 42. The turbine 42 is connected to the compressor 22 and provides the driving force for the compressor 22 that generates charge air supplied to the air intake manifold 24. Some temperature loss in the exhaust gas typically occurs as the exhaust gas passes through the turbine 42. As the exhaust gas leaves the turbine 42, it is directed to the exhaust filtration system 14, where it is treated before exiting the system 10.

A cooling system 48 may be connected with the engine 12. The cooling system 48 is a liquid cooling system that transfers waste heat out of the block and other internal components of the engine 12. Typically, the cooling system 48 consists of a closed loop similar to that of an automobile engine. Major components of the cooling system include a water pump, radiator or heat exchanger, water jacket (which consists of coolant passages in the block and heads), and a thermostat. As it relates to the present invention, the thermostat 50, which is the only component illustrated in FIG. 1, is connected with the ECU 28. The thermostat 50 is operable to generate a signal that is sent to the ECU 28 that indicates the temperature of the coolant used to cool the engine 12.

The system 10 includes a doser 52 that may be located in the exhaust manifold 38 and/or located downstream of the exhaust manifold 38. The doser 52 may comprise an injector mounted in an exhaust conduit 54. For the depicted embodiment, the agent introduced through the doser 52 is diesel fuel; however, other embodiments are contemplated in which one or more different dosing agents are used in addition to or in lieu of diesel fuel. Additionally, dosing could occur at a different location from that illustrated. For example, a fuel-rich setting could be provided by appropriate activation of injectors (not shown) that provide fuel to the engine in such a manner that engine 12 produces exhaust including a controlled amount of un-combusted (or incompletely combusted) fuel (in-cylinder dosing). Doser 52 is in fluid communication with a fuel line coupled to the same or a different fuel source (not shown) than that used to fuel engine 12 and is also connected with the ECU 28, which controls operation of the doser 52.

The system 10 also includes a number of sensors and sensing systems for providing the ECU 28 with information relating to the system 10. An engine speed sensor 56 may be included in or associated with the engine 12 and is connected with the ECU 28. The engine speed sensor 56 is operable to produce an engine speed signal indicative of engine rotation speed ("RPM") that is provided to the ECU 28. A pressure sensor 58 may be connected with the exhaust conduit 54 for measuring the pressure of the exhaust before it enters the exhaust filtration system 14. The pressure sensor 58 may be connected with the ECU 28. If pressure becomes too high, this may indicate that a problem exists with the exhaust filtration system 14, which may be communicated to the ECU 28. The pressure sensor 58 is also used to monitor the exhaust flow rate.

At least one temperature sensor 60 may be connected with the DOC unit 16 for measuring the temperature of the exhaust gas as it enters the DOC unit 16. In other embodiments, two temperature sensors 60 may be used, one at the entrance or upstream from the DOC unit 16 and another at the exit or downstream from the DOC unit 60. These temperature sensors are used to calculate the temperature of the DOC unit 16. In this alternative, an average temperature may be determined, using an algorithm, from the two respective temperature readings of the temperature sensors 60 to arrive at an operating temperature of the DOC unit 60.

Figure 2:
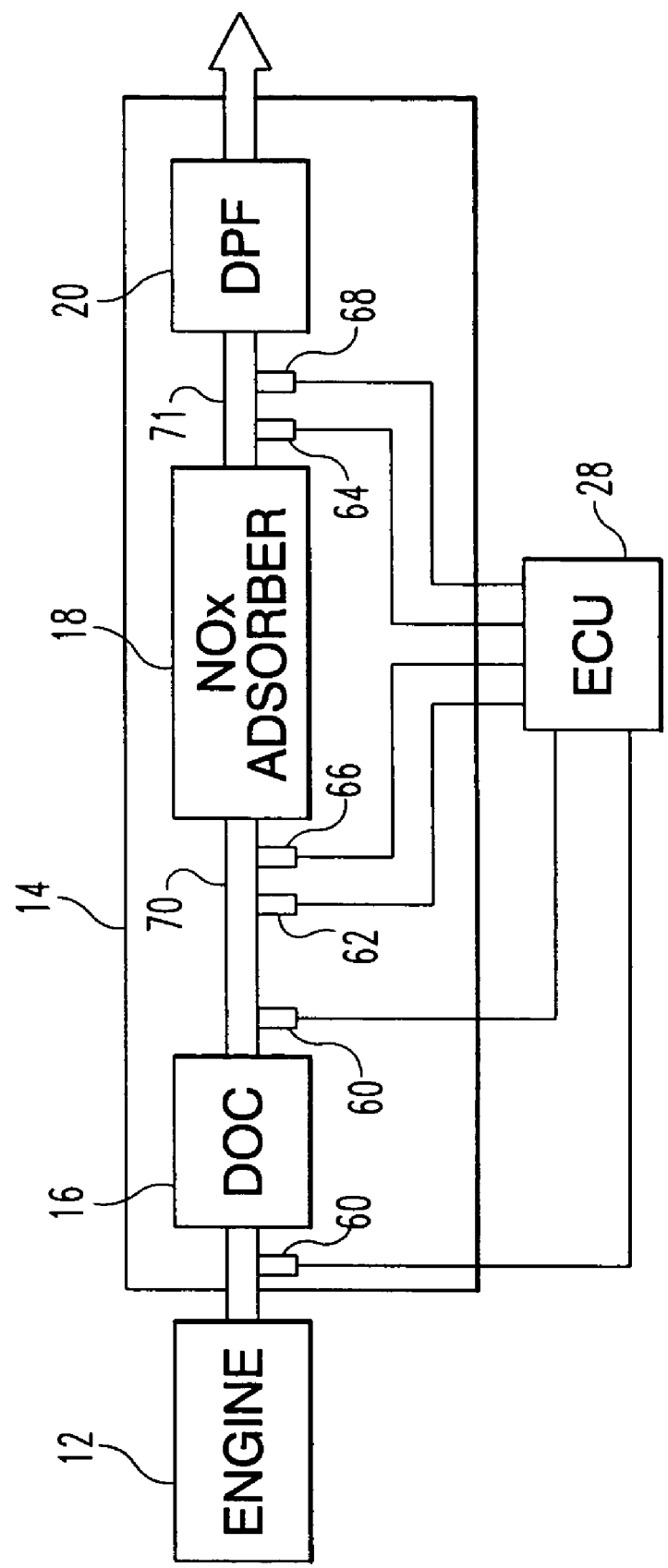
FIG. 2 is a more detailed schematic of the exhaust system of the representative diesel engine system.

Referring to FIG. 2, a more detailed diagram of the exhaust filtration system 14 is depicted connected in fluid communication with the flow of exhaust leaving the engine 12. A first $NO_x$ temperature sensor 62 may be in fluid communication with the flow of exhaust gas before entering or upstream of the $NO_x$ adsorber 18 and is connected to the ECU 28. A second $NO_x$ temperature sensor 64 may be in fluid communication with the flow of exhaust gas exiting or downstream of the $NO_x$ adsorber 18 and is also connected to the ECU 28. The $NO_x$ temperature sensors 62, 64 are used to monitor the temperature of the flow of gas entering and exiting the $NO_x$ adsorber 18 and provide electric signals that are indicative of the temperature of the flow of exhaust gas to the ECU 28. An algorithm may then be used by the ECU 28 to determine the operating temperature of the $NO_x$ adsorber 18.

A first universal exhaust gas oxygen ("UEGO") sensor or lambda sensor 66 may be positioned in fluid communication with the flow of exhaust gas entering or upstream from the $NO_x$ adsorber 18 and a second UEGO sensor 68 may be positioned in fluid communication with the flow of exhaust gas exiting or downstream of the $NO_x$ adsorber 18. The UEGO sensors 66, 68 are connected with the ECU 28 and generate electric signals that are indicative of the amount of oxygen contained in the flow of exhaust gas. The UEGO sensors 66, 68 allow the ECU 28 to accurately monitor airfuel ratios ("AFR") also over a wide range thereby allowing the ECU 28 to determine a lambda value associated with the exhaust gas entering and exiting the $NO_x$ adsorber 18. In alternative embodiments, the UEGO sensors 66, 68 may comprise $NO_x$ sensors 66, 68 that allow the ECU 28 to monitor the conversion efficiency of the $NO_x$ adsorber 18.

Figure 3:
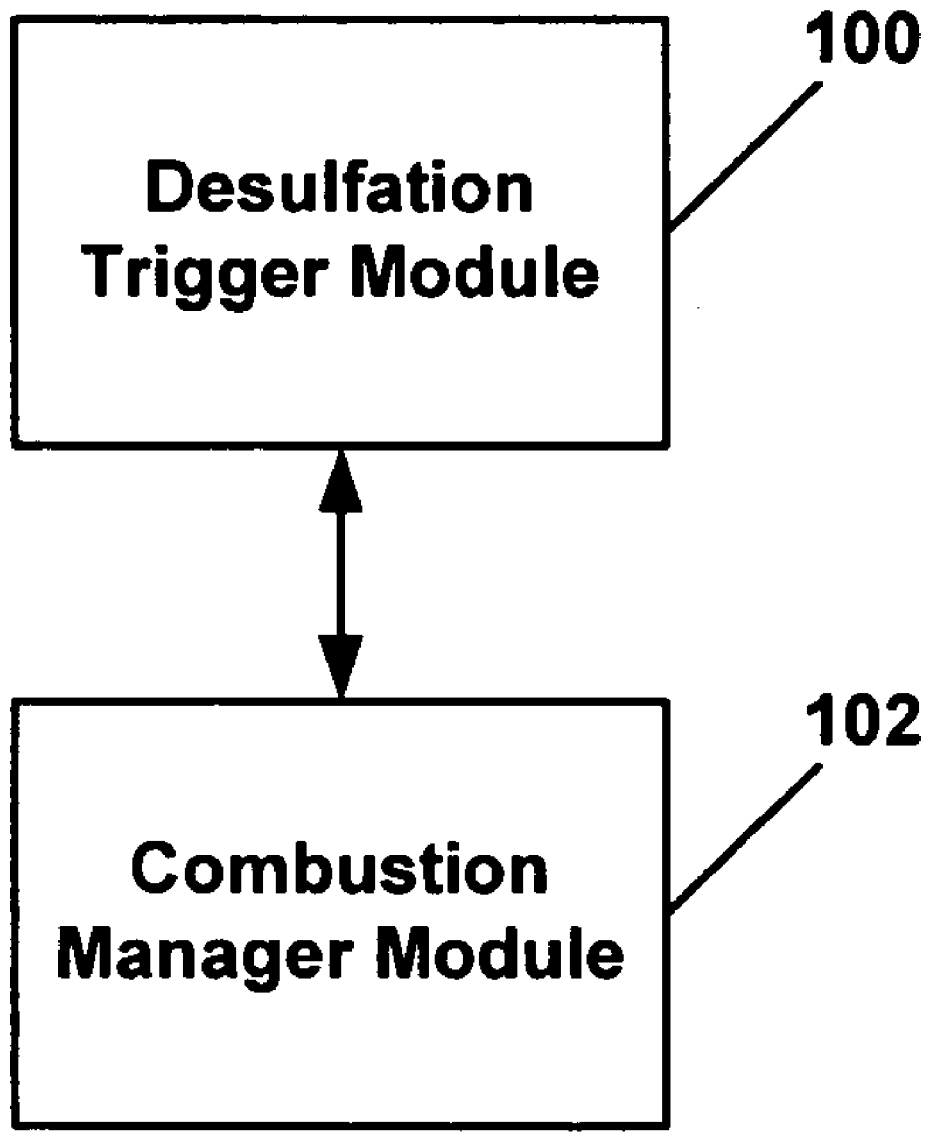
FIG. 3 illustrates a desulfation trigger module and a combustion manager module that are controllably associated with an internal combustion engine.

Referring to FIG. 3, the system 10 includes a desulfation trigger module or software routine 100 and a combustion manager module or software routine 102. In one embodiment, the desulfation trigger module 100 and the combustion manager module 102 are executable by the ECU 28. The desulfation trigger module 100 is responsible for, amongst other things, controlling the desulfation process of the $NO_x$ adsorber 18. After a predetermined period of engine operation, the $NO_x$ adsorber 18 requires regeneration to remove sulfur (i.e. $—SO_x$) that accumulates on or is trapped by the $NO_x$ adsorber 18. The desulfation trigger module 100 instructs the combustion manager module 102 to use engine management to control the air fuel ratio at an inlet 70 of the $NO_x$ adsorber 18 (see FIG. 2) with lean/rich cycling to provide reductant to regenerate sulfur that has accumulated or been trapped on the $NO_x$ adsorber 18.

As set forth above, the combustion manager module 102 is capable of controlling the engine 12 such that the air fuel ratio value or exhaust lambda value at the inlet 70 of the $NO_x$ adsorber 18 is selectively cycled between lean and rich lambda values to provide reductant to regenerate the $NO_x$ adsorber 18 during a regeneration or desulfation event. At the inlet 70, the exhaust lambda value is controlled through engine management to switch at a controlled frequency between lean and rich lambda values. In one embodiment, the exhaust lambda has a lean lambda target value of approximately 1.20 and a rich lambda target value of approximately 0.95. During desulfation mode, the combustion manager module 102 also controls the engine 12 such that the temperature of the $NO_x$ adsorber 18 is raised to at least 625° C., but preferentially approximately 650° C. The desulfation trigger module 100 instructs the combustion manager module 102 to control the duty cycle of the exhaust lambda at the inlet 70 of the $NO_x$ adsorber 18 to a lean lambda value for a first predetermined period of time and a rich lambda value for a second predetermined period of time, which regenerates the $NO_x$ adsorber 18. The UEGO sensor 66 at the inlet 70 of the $NO_x$ adsorber 18 is used by the ECU 28 and hence, the combustion manager module 102, to monitor the exhaust lambda value.

Figure 4:
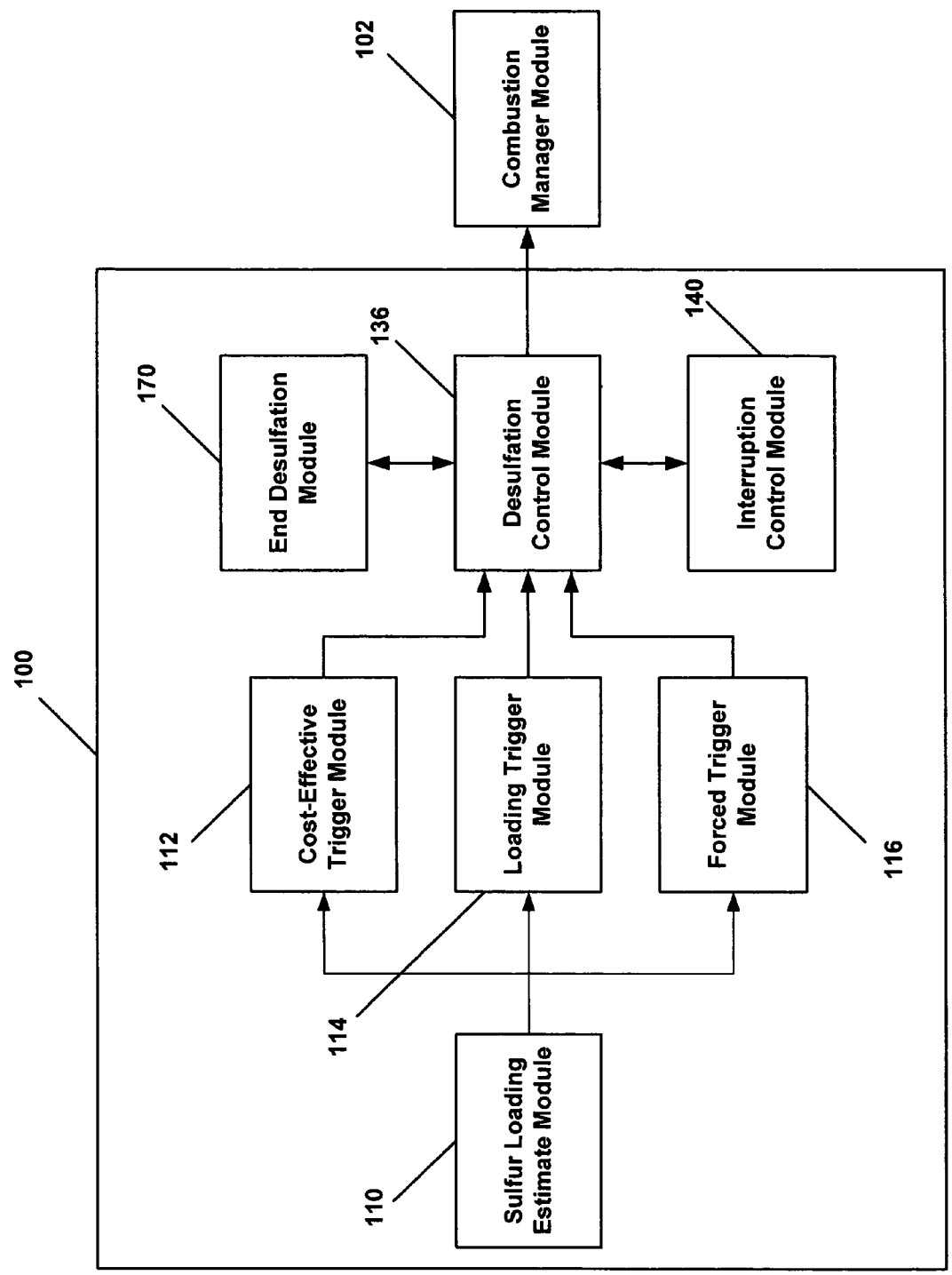
FIG. 4 is a more detailed block diagram of the desulfation trigger module.

Referring to FIG. 4, the desulfation trigger module 100 includes a sulfur loading estimate module 110, a cost-effective trigger module 112, a loading trigger module 114, and a forced trigger module 116. The sulfur loading estimate module 110 is used to estimate the accumulated $SO_x$ on the $NO_x$ adsorber 18. As set forth in greater detail below, the sulfur loading estimate module 110 estimates the accumulated $SO_x$ as a function of the consumed fuel mass or fuel consumption, assuming a known sulfur concentration in diesel fuel. The sulfur loading estimate module 110 also counts $SO_x$ deposited from combusted engine oil as a multiplication factor acting on the $SO_x$ accumulated rate due to fuel. The estimation also takes into account the residual sulfur left over on the $NO_x$ adsorber 18 from the last regeneration or desulfation event.

Figure 5:
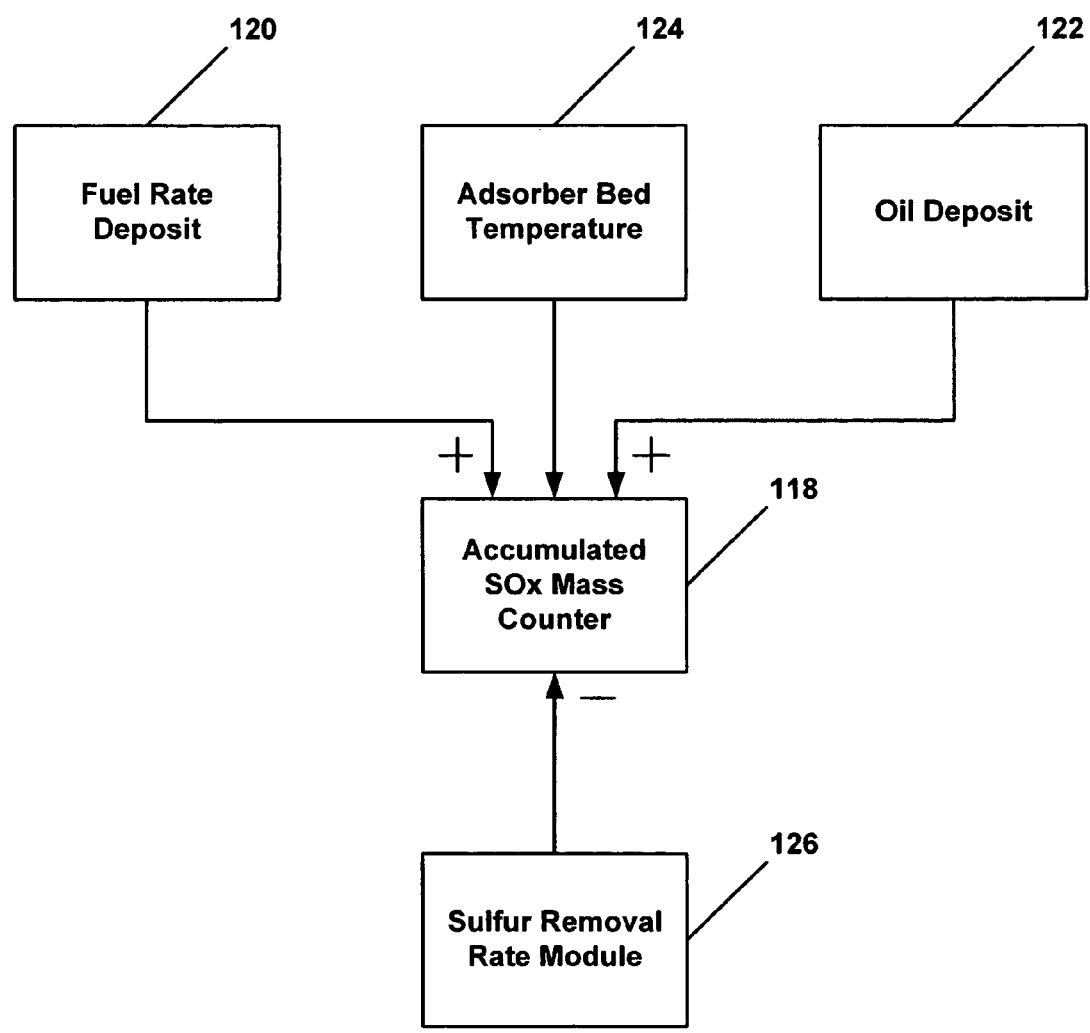
FIG. 5 is a more detailed block diagram of the sulfur loading estimate module.

Referring to FIG. 5, the sulfur loading estimate module 110 includes an accumulated sulfur mass counter 118. As the engine 12 runs, the accumulated sulfur mass counter 118 keeps track of the total sulfur mass that accumulates on the $NO_x$ adsorber 18. The amount of sulfur mass deposited is calculated as a function of a fuel rate deposit 120, an oil deposit 122, and an adsorber temperature value 124 of the $NO_x$ adsorber 18. The fuel rate deposit 120 is based on a known sulfur content in fuel (e.g.—15 parts per million in North America) and a known fuel rate consumed by the engine 12 during operation. The combustion manager module 102 keeps track of the rate and quantity of fuel that is provided to and consumed by the engine 12. The oil rate deposit 122, which is a sulfur mass deposited on the adsorber 18, is based on an estimate of the amount of sulfur contained in engine oil used to lubricate the engine 12. As the engine 12 runs, a small amount of oil combusts during the combustion process thereby depositing an additional amount of sulfur on the $NO_x$ adsorber 18.

The temperature of the $NO_x$ adsorber 18 is also used to calculate the amount of sulfur trapped or deposited in the $NO_x$ adsorber 18. The first and second $NO_x$ temperature sensors 62, 64 are connected with the control unit 28 and are utilized by the sulfur loading estimate module 110 to monitor and obtain the adsorber temperature value 124. As set forth above, the accumulated sulfur mass counter 118 estimates the amount of sulfur accumulated on the $NO_x$ adsorber 18 as a function of a known sulfur content in fuel (measured in parts per million) and the amount of fuel utilized by the engine 12 or fuel rate, oil consumption, and the temperature value of the $NO_x$ adsorber 18. During regeneration or a desulfation event, the rate of sulfur removal from the desulfation process is calculated by a sulfur removal rate module 126 as a function of the adsorber temperature value, the current estimated sulfur loading of the $NO_x$ adsorber 18, and the richness level of the air fuel ratio mixture of the exhaust provided at the inlet 70 of the $NO_x$ adsorber 18.

The accumulated sulfur mass counter 118 counts up when the system 10 is not operating in desulfation mode and counts down when the system 10 is operating in desulfation mode. A mass balance model is used to estimate how much sulfur is trapped or remains in the $NO_x$ adsorber 18. The mass balance model is represented by the following equation:

$$dM_t/dt = dM_a/dt - dM_r/dt$$

where $M_t$ is the total sulfur mass deposited in the $NO_x$ adsorber 18, $M_a$ is the accumulated sulfur mass from consumed fuel and oil, and $M_r$ is the mass of sulfur removed during regeneration. As set forth generally above, the accumulated sulfur mass ($M_a$) is represented as follows: $M_a$=f (sulfur content (ppm) in fuel, fuel rate, oil consumption, $NO_x$ adsorber temperature) and the removed sulfur mass ($M_r$) is represented as follows: $M_r$=f (current estimated sulfur load, air fuel ratio richness, $NO_x$ adsorber temperature).

Figure 6:
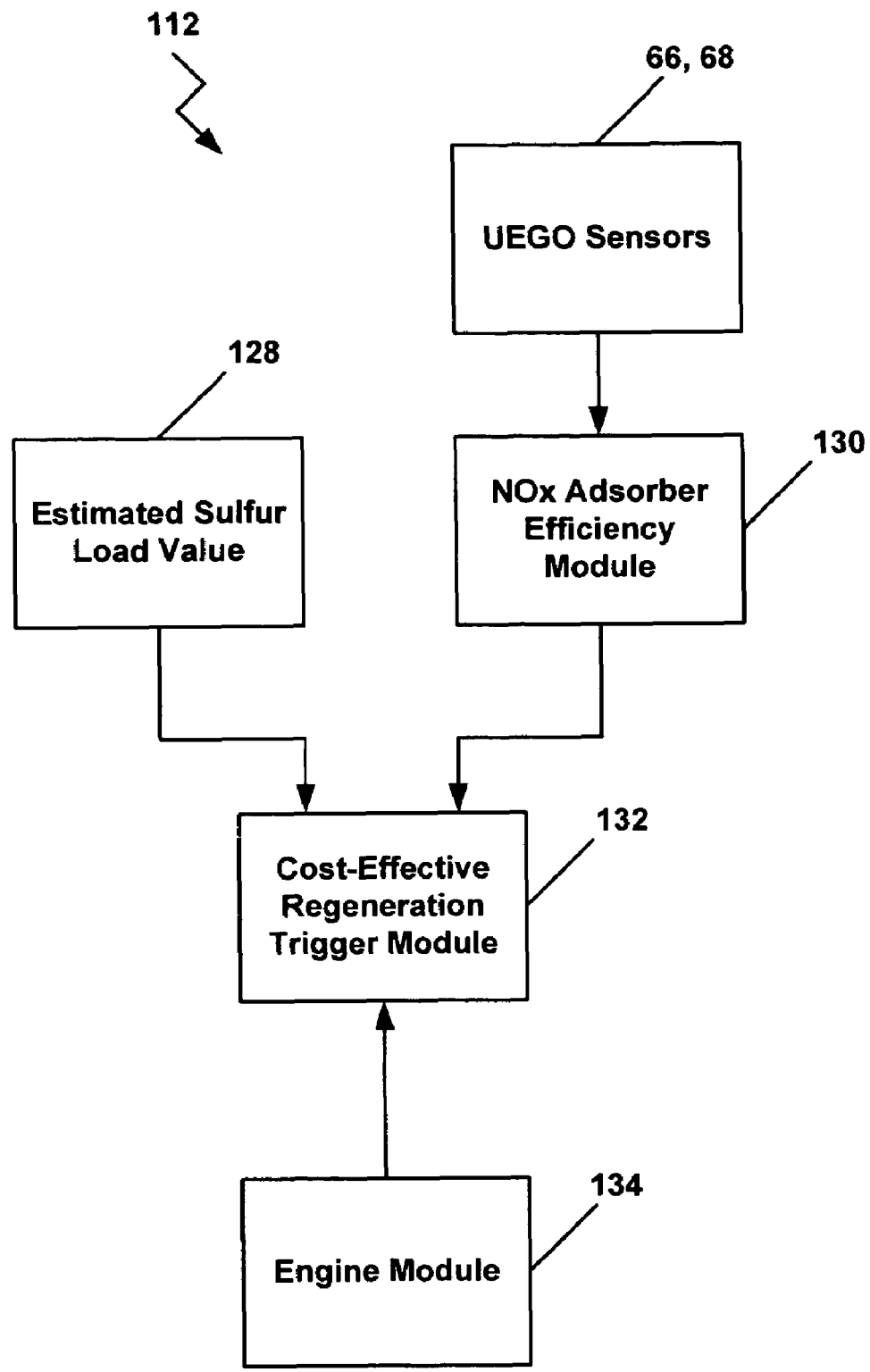
FIG. 6 is a more detailed block diagram of the cost effective trigger module of the desulfation trigger module.

Referring to FIGS. 5 and 6, the sulfur loading estimate module 110 generates an estimated sulfur load value 128 that is used by the cost-effective trigger module 112, the loading trigger module 114 and the forced trigger module 116. The cost-effective trigger module 112 includes a $NO_x$ adsorber efficiency module 130 that generates a $NO_x$ adsorber efficiency output that is indicative of the efficiency at which the $NO_x$ adsorber 18 is operating. As the $NO_x$ adsorber 18 operates and converts $NO_x$ into harmless gases, $SO_x$ builds up on the $NO_x$ adsorber 18 thereby reducing the efficiency at which the $NO_x$ adsorber 18 is able to operate. The $NO_x$ sensors 66, 68 provide signals to the $NO_x$ adsorber efficiency module 130 that allow it to calculate the efficiency at which the $NO_x$ adsorber 18 is operating. As such, a conversion efficiency value is calculated and provided to a cost-effective regeneration trigger module 132.

An engine module 134 is included that monitors various engine parameters such as fueling rate, post injection fueling, and temperature. The engine parameters are also provided as inputs to the cost-effective regeneration trigger module 132. As such, the cost-effective regeneration trigger module 132 uses the estimated sulfur load value 128, the conversion efficiency value provided by the $NO_x$ adsorber efficiency module 130, and engine parameters provided by the engine module 134 to determine when to generate a cost-effective trigger that is sent to a desulfation control module 136. The cost-effective trigger module 112 delivers the cost-effective trigger signal to the desulfation control module 136 when the engine 12 is capable of delivering an air fuel ratio at a rich mixture with minimum post injection fueling, thereby saving fuel, compared to the cost of removing the accumulated sulfur. In other words, if the engine 12 is operating such that regeneration can occur in a fuel efficient manner, the cost-effective trigger module 112 will trigger a desulfation process to occur when the estimated sulfur loading value 128 is at a predetermined lower threshold value.

Figure 7:
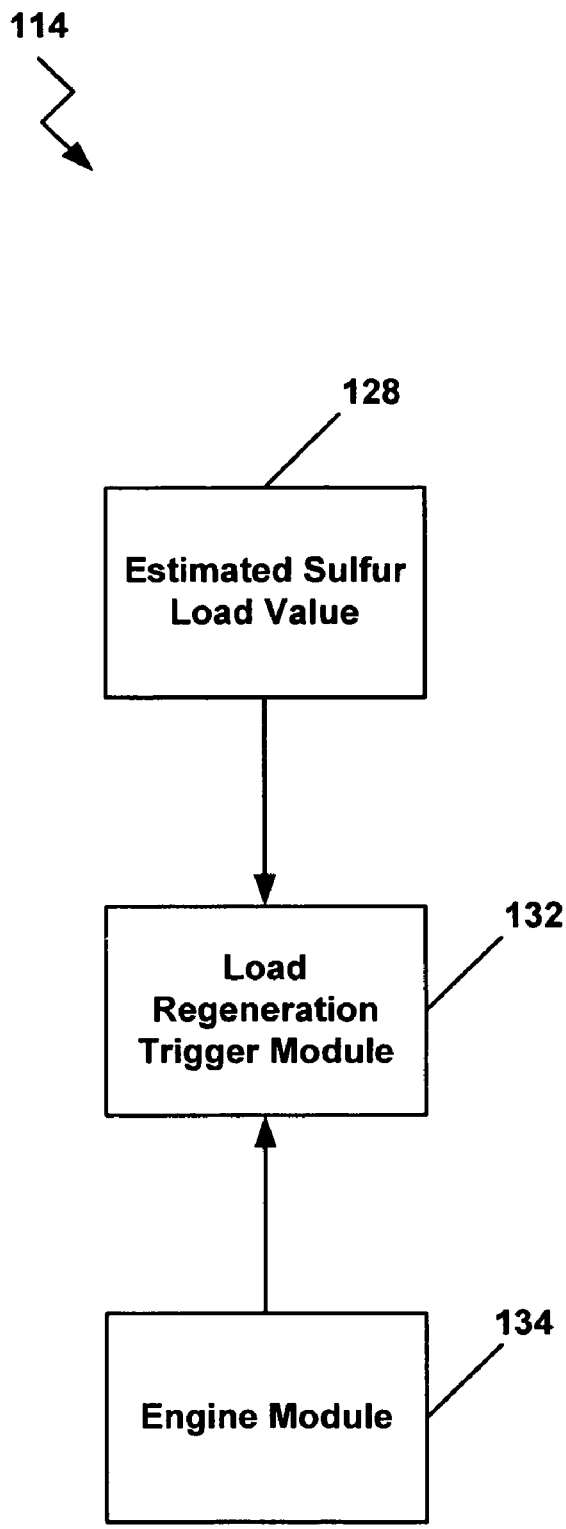
FIG. 7 is a more detailed block diagram of the loading trigger module.

Referring to FIGS. 4 and 7, the loading trigger module 114 is a trigger set point that causes a desulfation event to occur if the estimated sulfur load value 128 exceeds a predetermined threshold as long as the engine 12 is able to achieve desulfation conditions. A load regeneration trigger module 132 is used to monitor the estimated sulfur load value 128 and the engine operating parameters generated by the engine module 134. If the estimated sulfur load value 128 exceeds a predetermined loading value and the engine operating parameters monitored by the engine module 134 indicate that the engine 12 can achieve desulfation conditions, the load regeneration trigger module 132 generates a desulfation trigger that is provided to the desulfation control module 136.

The desulfation conditions include the engine 12 being capable of raising the temperature of the $NO_x$ adsorber 18 above approximately 625° C. and being able to deliver an air fuel ratio slightly richer under approximately stoichiometric conditions. Stoichiometric conditions correspond to the ideal combustion process during which fuel is burned completely. A complete combustion is a process which burns all the carbon (C) to ($CO_2$), all hydrogen (H) to ($H_2O$) and all sulfur (S) to ($SO_2$). If there are unburned components in the exhaust gas such as C, $H_2$, and CO, the combustion process is uncompleted. The loading level trigger optimizes the total amount of fuel consumed for desulfation and better recovered $NO_x$ performance through the life of the engine 12.

Figure 8:
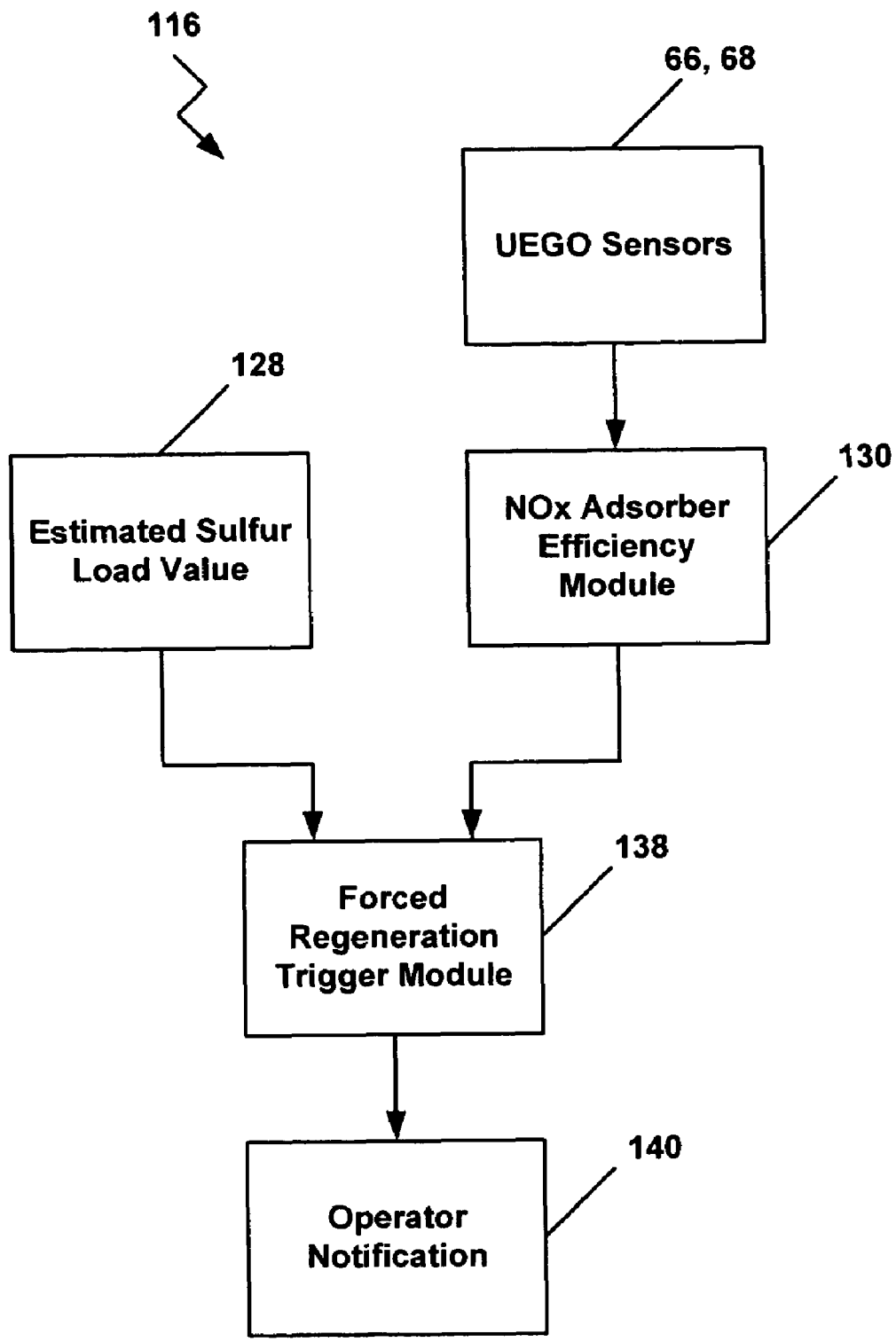
FIG. 8 is a more detailed block diagram of the forced trigger module.

Referring to FIGS. 4 and 8, the forced trigger module 116 is a trigger set point that causes a desulfation process to occur if the estimated sulfur load value 128 exceeds an upper threshold value and the conversion efficiency of the $NO_x$ adsorber 18 falls below a predetermined efficiency value. A forced regeneration trigger module 138 monitors the estimated sulfur load value 128 and the conversion efficiency of the $NO_x$ adsorber 18 using the $NO_x$ sensors 66, 68 and the $NO_x$ adsorber efficiency module 130. If the estimated sulfur load value 128 exceeds the upper threshold value and the conversion efficiency of the $NO_x$ adsorber 18 falls below a predetermined efficiency value, a forced desulfation trigger signal is generated that is sent to the desulfation control module 136. The third trigger event occurs regardless of engine parameters and fuel efficiency. An operator notification 140 may also be generated by the forced regeneration trigger module 138 to notify the driver of the vehicle that an "emergency" desulfation process needs to occur that instructs the driver to create favorable vehicle conditions to regenerate the $NO_x$ adsorber 18 or to take the vehicle in for service.

Referring to FIG. 4, once one of the three triggers set forth above is received by the desulfation control module 136, the desulfation control module 136 instructs the combustion manager module 102 to operate the engine 12 such that the $NO_x$ adsorber 18 is regenerated. The combustion manager module 102 modulates the air fuel ratio mixture of the engine 12 to create rich conditions as well as to increase the temperature of the $NO_x$ adsorber 18 to a temperature value required to perform desulfation. In one embodiment, the temperature value is approximately greater than 625° C., but preferably the temperature value is set to approximately 650° C. The lean/rich modulation is accomplished through control of the engine air system, fuel injection, post injection fueling, and timing. Referring to FIG. 1, the doser 52 may also provide external injection of fuel in the flow of exhaust to help increase the temperature of the $NO_x$ adsorber 18.

Figure 9:
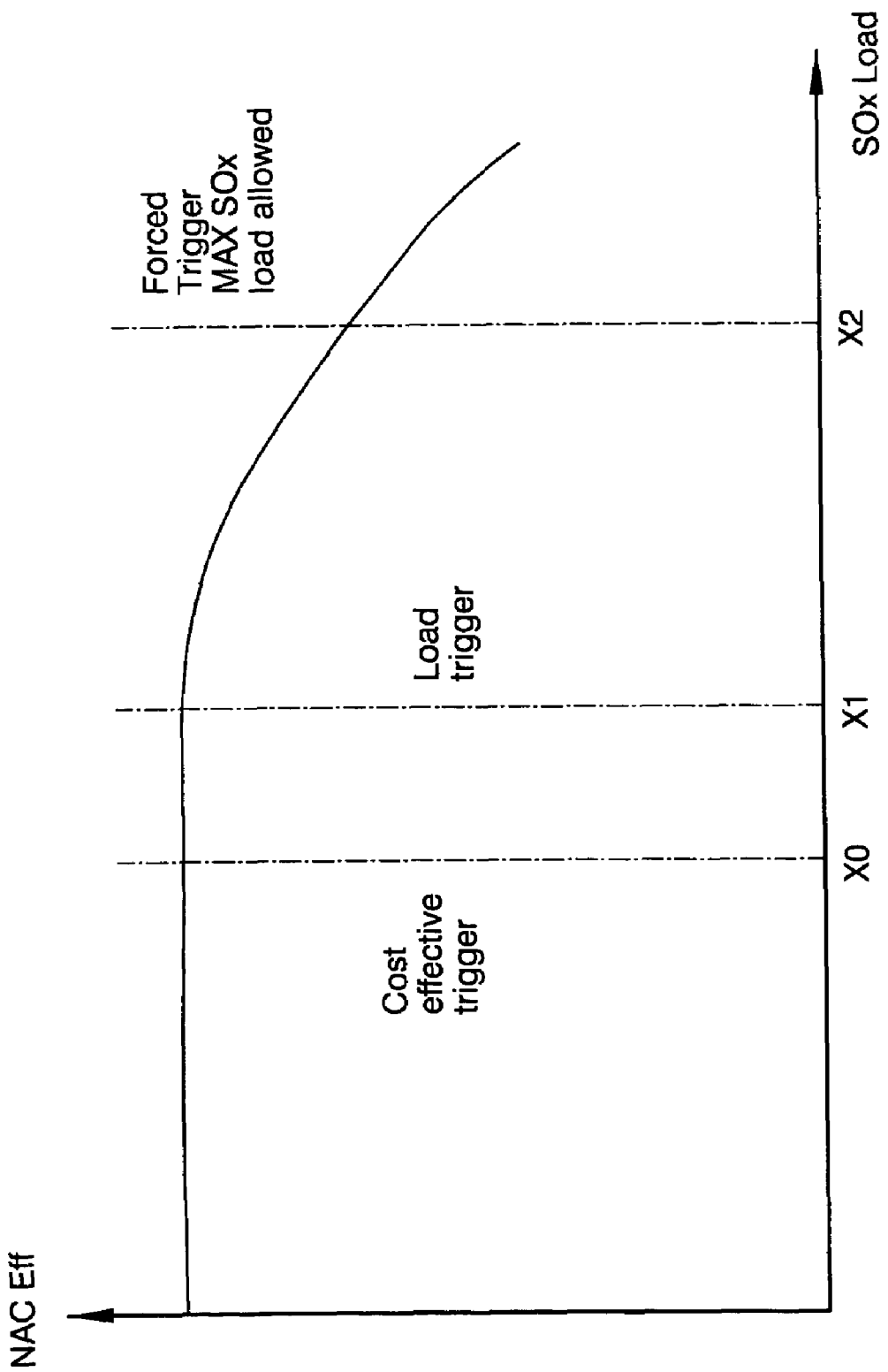
FIG. 9 is a graph illustrating representative trigger set points of the desulfation trigger module.

Referring to FIG. 9, a graph illustration of the three trigger levels described above is set forth. As illustrated, the cost-effective trigger is set to occur while the estimated $SO_x$ load is at a predetermined lower level while the $NO_x$ adsorber 18 is still operating at a highly efficient level. As set forth above, the cost-effective trigger occurs when engine parameters are such that the regeneration or desulfation process can occur in the most fuel economic manner. The load trigger is set to occur when the $SO_x$ load reaches a predetermined threshold value and the engine 12 is capable of achieving desulfation conditions without taking into account fuel economy. The forced trigger is set to occur once the $SO_x$ load reaches an upper threshold value thereby resulting in a significant drop in conversion efficiency.

Figure 10:
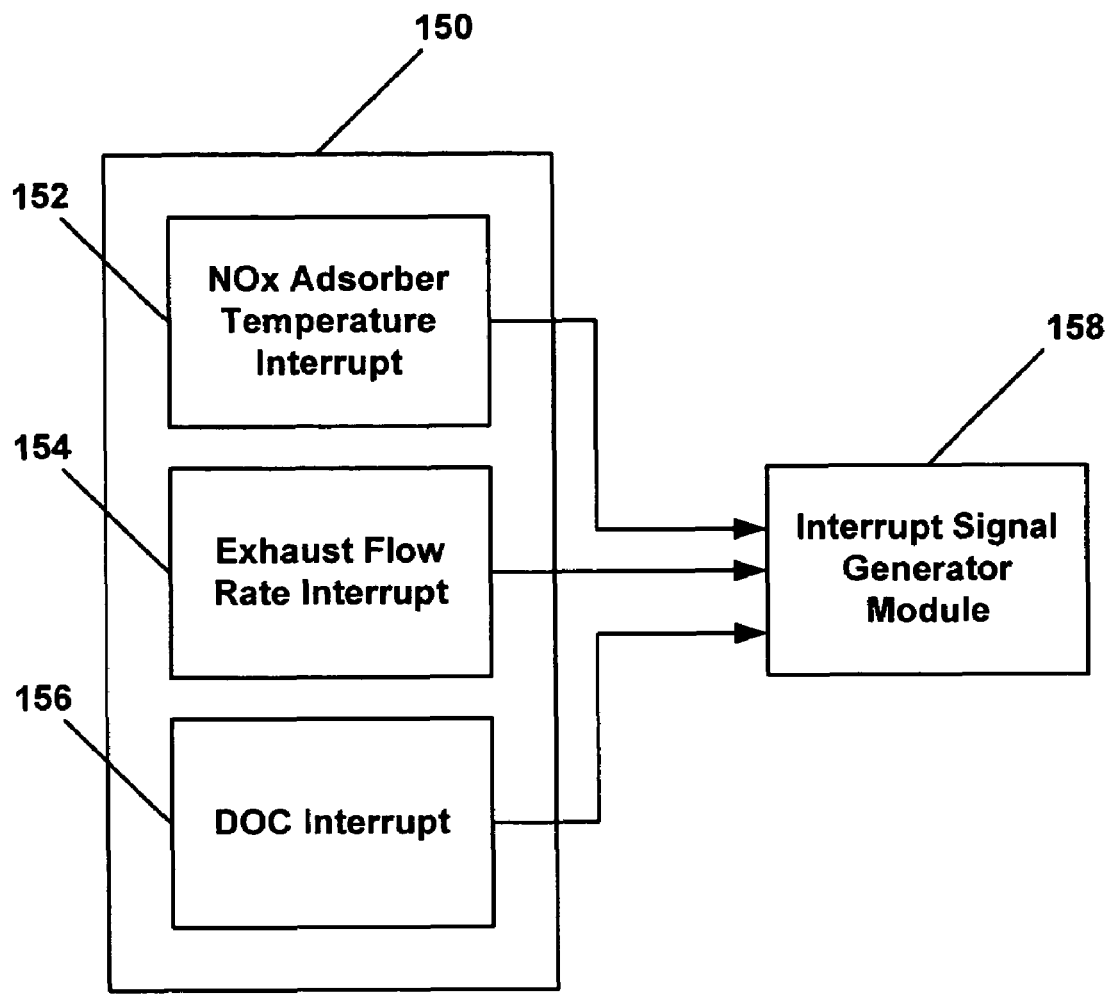
FIG. 10 is a more detailed block diagram of the interruption control module of the desulfation trigger module.

Referring back to FIG. 4, the desulfation trigger module 100 also includes an interruption control module 142. A number of conditions can occur that interrupt an on-going regeneration process to, amongst other things, protect the $NO_x$ adsorber 18 from thermal damage and fuel clogging. Referring to FIG. 10, a list of applicable interruption events 150 is set forth. The interruption events 150 may include a $NO_x$ adsorber temperature interrupt 152, an exhaust flow rate interrupt 154, and a DOC interrupt 156. If any of the interruption events occurs, an interrupt signal generator module 158 sends a signal that causes the desulfation control module 136 to stop an ongoing desulfation process.

The $NO_x$ adsorber temperature interrupt 152 occurs when the sensed temperature value at the inlet 70 of the $NO_x$ adsorber 18 exceeds a predetermined upper limit, when the sensed temperature value at the outlet of the $NO_x$ adsorber 18 exceeds a predetermined upper limit, or when the calculated temperature of the $NO_x$ adsorber 18 exceeds a predetermined upper limit. A reading from the first $NO_x$ temperature sensor 62 at the inlet 70 of the $NO_x$ adsorber 18 is utilized to generate the $NO_x$ adsorber temperature interrupt 152 as a function of the temperature at the inlet 70 of the $NO_x$ adsorber 18. A reading from the second $NO_x$ temperature sensor 64 is utilized to generate the $NO_x$ adsorber temperature interrupt 152 as a function of the temperature at the an outlet 71 of the $NO_x$ adsorber 18. The interruption control module 140 uses readings from both the first and second $NO_x$ temperature sensors 62, 64 to calculate the temperature of the $NO_x$ adsorber 18. As set forth above, if any of these temperature values exceeds a predetermined upper threshold value, the interruption control module 140 generates a signal or indication that causes the desulfation control module 136 to end an on-going desulfation event.

The second event that may trigger an interrupt to an ongoing desulfation event is an exhaust flow rate interrupt 154. If the exhaust flow rate falls below a predetermined threshold value with a calibrated hysteresis, the exhaust flow rate interrupt 154 will trigger, thereby causing the interrupt signal generator module 158 to instruct the desulfation control module 136 to stop the ongoing desulfation process or event. As previously set forth, the pressure sensor 58 is used to determine the exhaust flow rate. As such, if the interruption control module 140 detects that the exhaust flow rate falls below a predetermined value, the interrupt signal generator module 158 will generate a signal that ends the desulfation process.

The third event that may trigger an interrupt to an on-going desulfation event is a DOC interrupt 156. The DOC unit 16 may experience face plugging, which can be detected by the pressure sensor 58, that will require the desulfation event to stop. In addition, if the DOC unit 16 has not been lighted-off to oxidize unburned HC, the DOC interrupt 156 will not allow desulfation to occur until after the DOC unit 16 has been lighted-off. As such, the interruption control module 140 will stop or prohibit a desulfation event from occurring if a DOC interrupt 156 is detected or occurs. As used herein, a DOC event is used to refer to the DOC unit 16 experiencing face plugging or that the DOC unit 16 has not been lighted-off to oxidize unburned HC.

Figure 11:
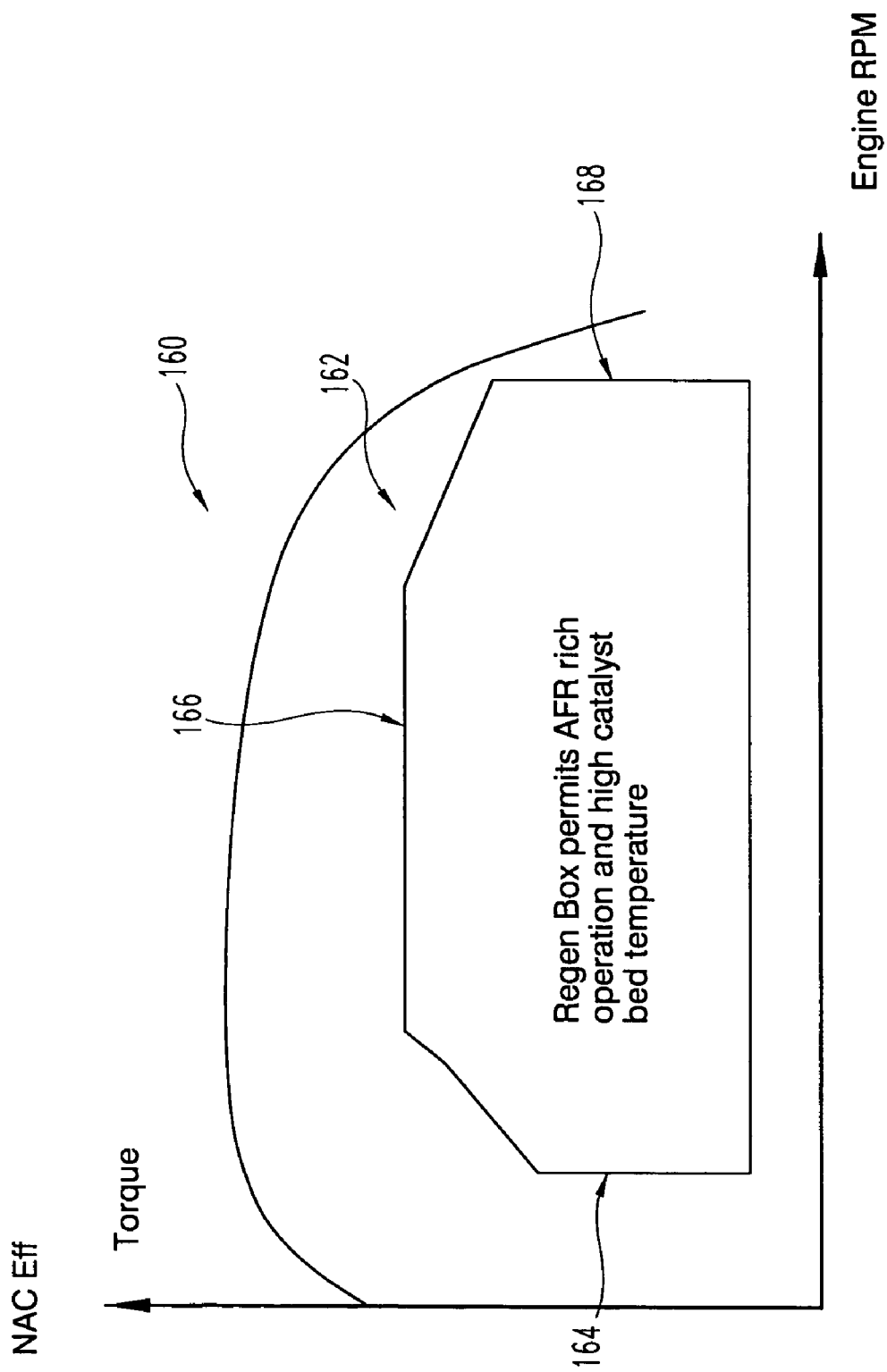
FIG. 11 represents an engine map where an engine may be operating during a desulfation event.

Referring to FIG. 11, in one embodiment, during a desulfation event or before a desulfation event is triggered, the engine 12 shall be operating within a calibrated engine map 160. The calibrated engine map 160 is based on a function of a torque value being provided by the engine 12 and the engine speed or RPM. The calibrated engine map 160 includes a regeneration box 162 that defines the parameters in which the engine 12 is able to provide an air fuel ratio at rich conditions as well as being capable of raising and maintaining the temperature of the $NO_x$ adsorber 18 at a high enough temperature for desulfation to occur. The regeneration box 162 is defined as a function of an exhaust flow limit 164, an engine temperature limit 166, and a fuel limit 168.

Referring back to FIG. 4, the desulfation trigger module 100 also includes an end desulfation module 170. The end desulfation module 170 is responsible for ending an ongoing desulfation process or event. Sulfur is effectively regenerated only if the temperature of the $NO_x$ adsorber 18 reaches a predetermined threshold and a rich air fuel ratio is delivered to the inlet 70 of the $NO_x$ adsorber 18. Referring to FIG. 6, the accumulated $SO_x$ mass counter 118, in addition to estimating of the amount of sulfur that has accumulated on the $NO_x$ adsorber 18, is also responsible for subtracting sulfur mass from the estimated accumulated mass as a result of a desulfation event. As such, the sulfur removal rate module 126 will subtract sulfur from the value of the counter during a desulfation event. The rate at which the sulfur removal rate module 126 subtracts from the total estimated sulfur mass is based on a function of the time or duration of the desulfation event, the temperature of the $NO_x$ adsorber 18, and the air fuel ratio value at the inlet 70 of the $NO_x$ adsorber 18.

Figure 12:
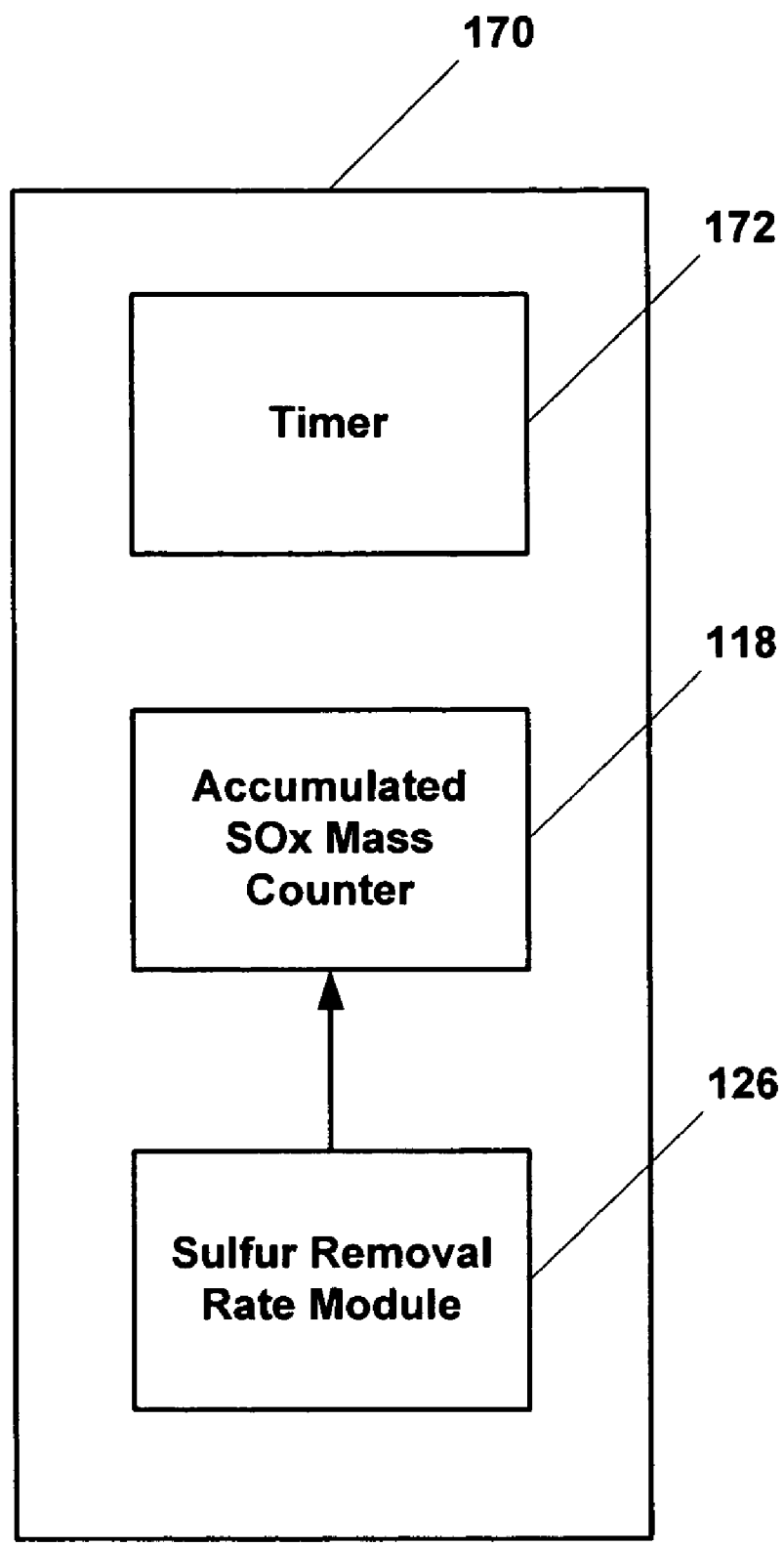
FIG. 12 is a more detailed block diagram of the end desulfation module of the desulfation trigger module.

Referring to FIG. 12, the end desulfation module 170 includes a timer 172 that counts the actual desulfation time or time spent during a desulfation event. As previously set forth, a desulfation event occurs when the desulfation control module 136 instructs the combustion manager module 102 to conduct engine management such that the temperature of the $NO_x$ adsorber 18 is raised above approximately 625° C. and the air fuel ratio provided at the inlet 70 of the $NO_x$ adsorber 18 is rich. When these parameters are reached, the timer 172 counts the amount of time spent during a desulfation event. In addition, during the desulfation event, the value of the accumulated $SO_x$ mass counter 118 is decreased in proportion to the amount of $SO_x$ removed during the desulfation process. As previously set forth, the sulfur removal rate module 126 is responsible for decreasing the value of the accumulated $SO_x$ mass counter 118 during the desulfation process.

Based on the value of the timer 172 and the value of the accumulated $SO_x$ mass counter 118, a desulfation event is complete when any of the conditions set forth below are met. The first condition is met when the value of the timer 172 exceeds a predetermined threshold or amount of time and the estimated sulfur load value 128 from the accumulated $SO_x$ mass counter 118 is reduced to a minimum threshold, which in the preferred embodiment is zero, which indicates that all of the accumulated sulfur has been removed. The second condition is met when the value of the timer 172 exceeds a predetermined value and the desulfation event is interrupted, but the estimated sulfur load value 128 from the accumulated $SO_x$ mass counter 118 is reduced to a predetermined level. The third condition is met when the estimated sulfur load value 128 from the accumulated $SO_x$ mass counter 118 is reduced zero through regeneration, but the desulfation event is interrupted. If a desulfation event fails to complete in a predetermined number of consecutive attempts, a dash lamp notification module 174 may generate an indication to the operator of the vehicle to force a regeneration in more favorable desulfation conditions.

Referring back to FIG. 4, the desulfation control module 136 instructs the combustion manager module 102 to conduct a desulfation event when triggered by the cost-effective trigger module 112, the loading trigger module 114, and/or the forced trigger module 116. The combustion manager module 102 is operable to control the engine 12 through engine management such that desulfation of the $NO_x$ adsorber 18 can occur. As set forth above, the combustion manager module 102 is capable of managing engine operation such that the temperature of the $NO_x$ adsorber 18 is raised above approximately 6250 C and the exhaust provided to the $NO_x$ adsorber 18 is cycled at a rich air fuel value so that regeneration of the $NO_x$ adsorber 18 can occur.

In alternative embodiments of the present invention some of the modules described herein may be replaced by electronic circuits, which may comprise analog and digital circuitry. In other embodiments, the modules may comprise a combination of electronic circuits and microprocessor based components. As such, use of the term module herein should be broadly construed to include one or more of these combinations as well as software designed to provide the functionality described herein.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
   a sulfur loading estimate module for generating an estimated sulfur loading value associated with an adsorber calculated as a function of a fueling rate;
   a desulfation trigger module for triggering a desulfation event for said adsorber upon detection of a trigger event, wherein said trigger event comprises a cost-effective trigger for triggering said desulfation event at a fuel efficient engine operating mode once said estimated sulfur loading value exceeds a predetermined threshold, wherein said cost-effective trigger is triggered as a function of said estimated sulfur loading value, a sensed conversion efficiency value of said adsorber, and one or more engine operating parameters indicative of a minimum post injection fueling requirement needed to deliver a rich air to fuel ratio at an inlet of said adsorber;
   a interrupt module for interrupting said desulfation event upon detection of an interrupt event; and
   an end desulfation module for stopping said desulfation event upon detection of an end desulfation event.

2. The system of claim 1, wherein said estimated sulfur loading value is further calculated as a function of a sulfur content in fuel, an oil consumption value, and a temperature value of said adsorber.

3. The system of claim 1, wherein said interrupt event comprises an adsorber temperature value interrupt that interrupts said desulfation event if a temperature value of said adsorber rises above a predetermined threshold.

4. The system of claim 1, wherein said interrupt event comprises an exhaust flow rate interrupt that interrupts said desulfation event if an exhaust flow rate to said adsorber falls below a predetermined threshold.

5. The system of claim 1, wherein said interrupt event comprises a diesel oxidation catalyst unit event, where said diesel oxidation catalyst unit event triggers said interrupt event when a diesel oxidation catalyst unit is experiencing face plugging or said diesel oxidation catalyst unit has not been lighted-off to oxidize unburned hydrocarbons.

6. The system of claim 1, wherein said end desulfation event comprises a timer reaching a predetermined value.

7. The system of claim 1, wherein said end desulfation event is generated when said estimated sulfur loading value is reduced to a predetermined value.

8. The system of claim 1, wherein said end desulfation event comprises a timer reaching a predetermined value and said estimated sulfur loading value is reduced to a predetermined value.

9. The system of claim 1, wherein said trigger event further comprises a loading trigger for triggering said desulfation event once said estimated sulfur loading value exceeds a predetermined threshold and a combustion manager module is capable of operating an engine in a desulfation mode.

10. The system of claim 9, wherein said desulfation mode comprises increasing a temperature value of said adsorber to a predetermined temperature and providing exhaust at an inlet of said adsorber at a rich air fuel ratio value.

11. The system of claim 9, wherein said trigger event further comprises a forced trigger for triggering said desulfation event once said estimated sulfur loading value exceeds a predetermined threshold and said adsorber drops to a predetermined efficiency value.

12. The system of claim 1, wherein said estimated sulfur loading value is further calculated as a function of a sulfur content in fuel.

13. The system of claim 12, wherein said estimated sulfur loading value is further calculated as a function of an oil consumption value.

14. The system of claim 13, wherein said estimated sulfur loading value is further calculated as a function of a temperature value of said adsorber.

15. The system of claim 1, wherein said sulfur loading estimate module uses a counter to generate said estimated sulfur loading value.

16. The system of claim 15, wherein said sulfur loading estimate module increases said counter when said desulfation event is not on-going and decreases said counter when said desulfation event is on-going.

17. A method, comprising:
   generating an estimated sulfur loading value associated with an adsorber calculated as a function of a fueling rate;

triggering a desulfation event for said adsorber upon detection of a trigger event, wherein said trigger event comprises a cost-effective trigger for triggering said desulfation event at a fuel efficient engine operating mode, wherein said cost-effective trigger is triggered as a function of said estimated sulfur loading value, a sensed conversion efficiency value of said adsorber, and one or more engine operating parameters indicative of a minimum post injection fueling requirement needed to deliver a rich air to fuel ratio at an inlet of said adsorber;

interrupting said desulfation event upon detection of an interrupt event; and ending said desulfation event upon detection of an end desulfation event.

18. The method of claim 17, wherein said trigger event may be selected from a group of trigger events comprising (a) a cost-effective trigger for triggering said desulfation event at a fuel efficient engine operating mode once said estimated sulfur loading value exceeds a predetermined threshold; (b) a loading trigger for triggering said desulfation event once said estimated sulfur loading value exceeds a predetermined threshold and a combustion manager module is capable of operating an engine in a desulfation mode; and (c) a forced trigger for triggering said desulfation event once said estimated sulfur loading value exceeds a predetermined threshold and said adsorber drops to a predetermined efficiency value.

19. The method of claim 17, wherein said estimated sulfur loading value is further calculated as a function of a sulfur content in fuel, an oil consumption value, and a temperature value of said adsorber.

20. The method of claim 17, further comprising the step of reducing said estimated sulfur loading value as a function of a value of said estimated sulfur loading value, an air fuel richness ratio, and a temperature value associated with said adsorber during said desulfation event.

21. The method of claim 17, wherein said interrupt event comprises a temperature value associated with said adsorber rising above a predetermined threshold.

22. The method of claim 17, wherein said interrupt event comprises a temperature value associated with an inlet of said adsorber rising above a predetermined threshold.

23. The method of claim 17, wherein said interrupt event comprises a temperature value associated with an outlet of said adsorber rising above a predetermined threshold.

24. The method of claim 17, wherein said interrupt event comprises an exhaust flow rate falling below a predetermined rate.

25. The method of claim 17, wherein said interrupt event comprises a diesel oxidation catalyst unit event wherein a diesel oxidation catalyst unit has not been lighted-off prior to said desulfation event.

26. The method of claim 17, wherein said end desulfation event comprises a desulfation timer exceeding a calibrated amount of time.

27. The method of claim 17, wherein said end desulfation event comprises said estimated sulfur loading value being reduced to a predetermined value during said desulfation event.

28. The method of claim 17, wherein said trigger event comprises a loading trigger for triggering said desulfation event once said estimated sulfur loading value exceeds a predetermined threshold and a combustion manager module is capable of operating an engine in a desulfation mode.

29. The method of claim 28, wherein said trigger event comprises a forced trigger for triggering said desulfation event once said estimated sulfur loading value exceeds a predetermined threshold and said adsorber drops to a predetermined efficiency value.

30. A system, comprising:
a sulfur loading estimate module for generating an estimated sulfur loading value associated with an adsorber calculated as a function of a fueling rate, a sulfur content in fuel, an oil consumption value, and a temperature value of said adsorber;

a desulfation trigger module for triggering a desulfation event for said adsorber upon detection of a trigger event, wherein said trigger event comprises a cost-effective trigger for triggering said desulfation event at a fuel efficient engine operating mode once said estimated sulfur loading value exceeds a predetermined threshold, a loading trigger for triggering said desulfation event once said estimated sulfur loading value exceeds a predetermined threshold and a combustion manager module is capable of operating an engine in a desulfation mode, and a forced trigger for triggering said desulfation event once said estimated sulfur loading value exceeds a predetermined threshold and said adsorber drops to a predetermined efficiency value;

a interrupt module for interrupting said desulfation event upon detection of an interrupt event; and an end desulfation module for stopping said desulfation event upon detection of an end desulfation event, wherein said end desulfation event is generated when said estimated sulfur loading value is reduced to a predetermined value.

31. The system of claim 30, wherein said cost-effective trigger is triggered as a function of said estimated sulfur loading value and one or more engine operating parameters indicating a requirement of minimum post injection fueling needed to deliver a rich air to fuel ratio at an inlet of said adsorber.

32. The system of claim 30, wherein said interrupt event comprises a diesel oxidation catalyst unit event.

33. The system of claim 32, wherein said diesel oxidation catalyst unit event comprises a diesel oxidation catalyst unit experiencing face plugging.

34. The system of claim 32, wherein said diesel oxidation catalyst unit event comprises a diesel oxidation catalyst unit not being lighted-off to oxidize unburned hydrocarbons.

* * * * *